US009727843B2

United States Patent
Apajalahti et al.

(10) Patent No.: US 9,727,843 B2
(45) Date of Patent: Aug. 8, 2017

(54) METHOD AND ARRANGEMENT FOR GENERATING EVENT DATA

(71) Applicant: Blucup Ltd., Helsinki (FI)

(72) Inventors: Jaan Apajalahti, Helsinki (FI); Rauli Rikama, Helsinki (FI); Antti Rikkinen, Helsinki (FI)

(73) Assignee: BLUCUP LTD., Helsinki (FI)

( * ) Notice: Subject to any disclaimer, the term of this patent is extended or adjusted under 35 U.S.C. 154(b) by 349 days.

(21) Appl. No.: 14/488,787

(22) Filed: Sep. 17, 2014

(65) Prior Publication Data

US 2016/0078062 A1 Mar. 17, 2016

(51) Int. Cl.
*G06F 17/30* (2006.01)
*G06Q 10/10* (2012.01)

(52) U.S. Cl.
CPC ....... *G06Q 10/10* (2013.01); *G06F 17/30477* (2013.01)

(58) Field of Classification Search
CPC ......... G06F 17/30477; G06F 17/30289; G06F 17/30545; G06F 17/30914; G06F 17/30011
USPC ...................................................... 707/803
See application file for complete search history.

(56) References Cited

U.S. PATENT DOCUMENTS

| 2002/0023109 | A1* | 2/2002 | Lederer et al. | 707/511 |
| 2014/0297350 | A1* | 10/2014 | Kidron et al. | 707/804 |
| 2014/0376712 | A1* | 12/2014 | Mondri et al. | 379/265.09 |
| 2014/0380190 | A1* | 12/2014 | Mondri et al. | 715/753 |

OTHER PUBLICATIONS

Zhang et al., Rule-Based Platform for Web User Profiling, 2006, IEEE, 1183-1187.*

* cited by examiner

*Primary Examiner* — Jean B Fleurantin
(74) *Attorney, Agent, or Firm* — Muncy, Geissler, Olds & Lowe, PC

(57) ABSTRACT

The present invention concerns a method and arrangement for generating event data from e.g., a meeting. A management system, an event template repository and a user equipment is provided. The management system is preferably a CRM system and is arranged to manage customer related information. The event template repository stores template information comprising at least one input query corresponding to customer information and having a plurality of associated input values, and input interpretation information for determining an input value and an action for each input value. The user equipment, having at least a display and an input capturing device, presents the user with an input query and captures a user input in response. An input value and an action is determined for each user input in accordance with input interpretation information. Furthermore, the determined action is executed.

11 Claims, 2 Drawing Sheets

METHOD AND ARRANGEMENT FOR GENERATING EVENT DATA

FIELD

The present invention relates to a method and an arrangement for generating event data. More particularly, event data is generated based on user inputs in response to input queries.

BACKGROUND

Events, such as meetings are commonly used for interacting and sharing information between participants. For such an event to be productive, the contents, results and decisions discussed, and actions to follow should be well documented and put into action. For the documentation to be complete, it should be made during the event so that details are not forgotten later on. Traditionally documentation has been done using a pen and paper or a computer during a meeting by one of the participants. However, detailed documentation may draw attention from the meeting itself, thus resulting in a low-quality documentation and/or meeting. In a meeting with many participants, a single person may be chosen to focus on solely composing the documentation, but in smaller meetings this is often not a feasible option. Additionally, the contents of the documentation often has to be exported into different systems separately afterwards, which is often complex and time consuming.

BRIEF SUMMARY

It is an object of the present invention is to provide a method and an arrangement enabling a participant of an event to quickly and efficiently document the contents of the event by entering user inputs in response to input queries presented by a user equipment.

In accordance with an aspect of the present invention, there is provided a method for generating event data, comprising the steps of:
  providing a management system arranged to transmit, receive and store customer related information of at least one customer, said customer related information comprising at least one event data field;
  providing an event template repository arranged to transmit, receive and store template information of at least one event template, said template information comprising:
    at least one input query, corresponding to said at least one event data field of the customer related information of the management system, and having a plurality of associated input values;
    input interpretation information for each input query, said input interpretation information associating a user input to an input value from the plurality input values, and associating said user input to at least one action;
  providing a user equipment having at least a display and an input capturing device;
  presenting said at least one input query with the display of the user equipment;
  capturing a user input in response to said at least one input query with the input capturing device,
  determining an input value for each user input in accordance with the input interpretation information; and
  executing at least one action for each user input in accordance with the input interpretation information.

In accordance with a second aspect of the present invention, there is provided an arrangement for generating a structured report of an event, the arrangement comprising:
  a network interface;
  a management system arranged to store customer related information of at least one customer, and to transmit and receive said customer related information via the network interface, said customer related information comprising at least one event data field;
  an event template repository arranged to store template information of at least one event template, and to transmit and receive said template information via the network interface, said template information comprising:
    at least one input query, corresponding to said at least one event data field of the customer related information of the management system, and having a plurality of associated input values;
    input interpretation information for each input query, said input interpretation information associating a user input to an input value from the plurality input values, and associating said user input to at least one action;
  a user equipment having at least a memory, a processor, a display and an input capturing device, said user equipment being arranged to transmit and receive data via the network interface, wherein the user equipment is configured to:
    present said at least one input query with the display of the user equipment;
    capture a user input in response to said at least one input query with the input capturing device,
    determine an input value for each user input in accordance with the input interpretation information; and
    execute at least one action for each user input in accordance with the input interpretation information.

In accordance with a third aspect of the present invention, there is provided an arrangement for generating a structured report of an event, the arrangement comprising:
  a processor, a memory, a display, an input capturing device and a network interface, said processor, memory, display, input capturing device and network interface being in communication with each other, wherein the memory has instructions for causing the processor to execute the steps of:
  providing a management system arranged to transmit, receive and store customer related information of at least one customer, said customer related information comprising at least one event data field;
  providing an event template repository arranged to transmit, receive and store template information of at least one event template, said template information comprising:
    at least one input query, corresponding to said at least one event data field of the customer related information of the management system, and having a plurality of associated input values;
    input interpretation information for each input query, said input interpretation information associating a user input to an input value from the plurality input values, and associating said user input to at least one action;
  providing a user equipment having at least a display and an input capturing device;
  presenting said at least one input query with the display means of the user equipment;

capturing a user input in response to said at least one input query with the input capturing device, determining an input value for each user input in accordance with the input interpretation information; and executing at least one action for each input in accordance with the input interpretation information.

Thus, the present invention enables event data to be generated during a meeting without distracting the participants away from the topics being discussed. Furthermore, as the contents of the event may be presented as a report having a predefined structure, the need to translate a verbal description into a form that can be exported to a management system, is eliminated.

BRIEF DESCRIPTION OF THE DRAWINGS

Hereafter, the present invention is discussed in detail with reference to the following figures, in which.

It should be noted that, for the sake of clarity, the above mentioned figures are simplified illustrations of the present invention. Thus, the drawings are not to be considered as restrictive.

DETAILED DESCRIPTION

Figure 1:
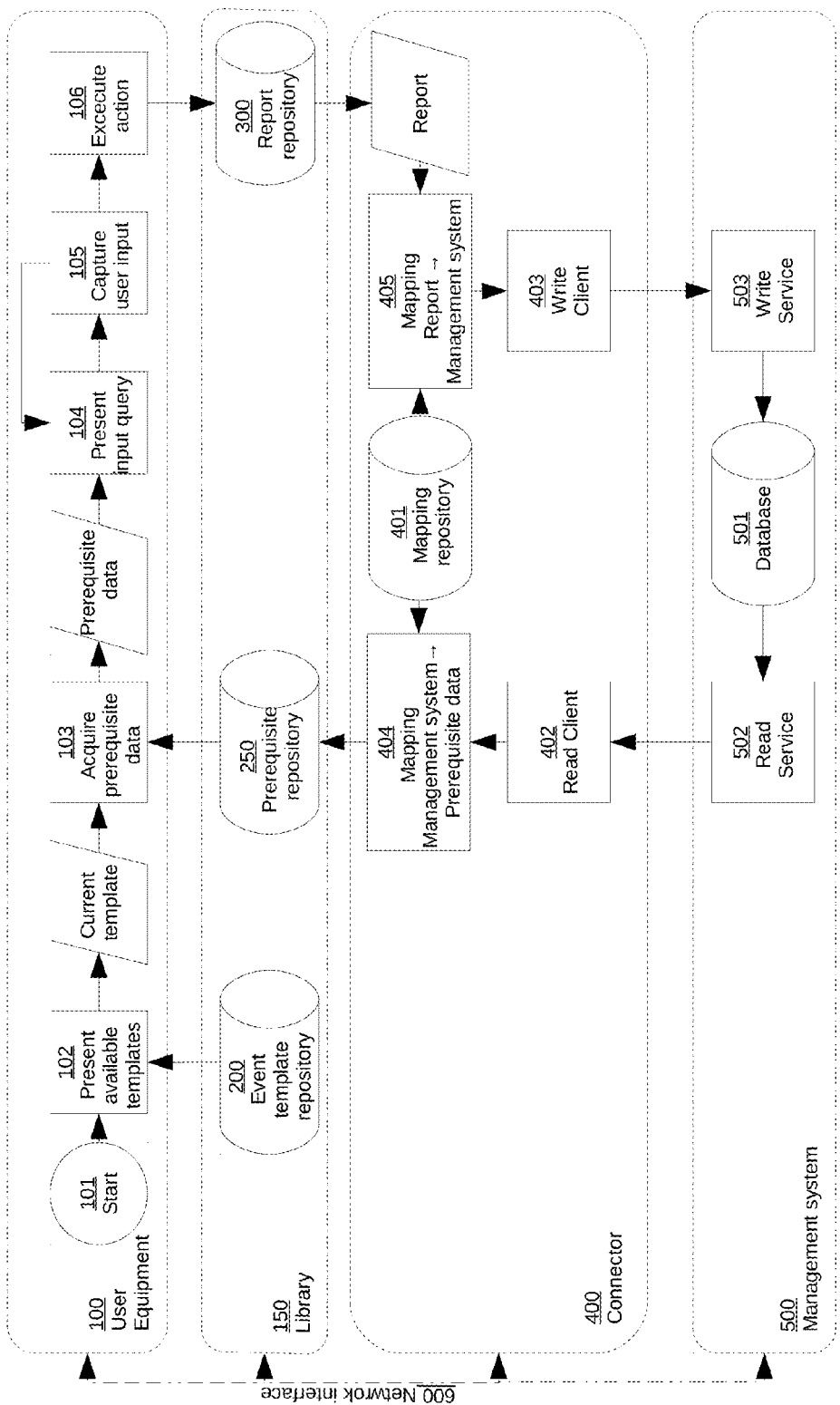
FIG. 1 is a flowchart illustrating an overview of an embodiment of the present invention.

In the overview of FIG. 1, a user equipment 100, an event template repository 200, and a management system 500, are provided. Also, a network interface 600 is provided, thus enabling communication between each of the entities.

The management system 500 comprises a database 501 for storing customer related information of at least one customer. More specifically, customer related information of each customer may comprise event data fields for storing event specific data and customer data fields for storing customer specific data.

Furthermore, the management system comprises a read service 502 allowing transmitting information and a write service 503 allowing receiving information through an application programming interface (API) of the management system In the embodiment of FIG. 1, the user equipment 100 communicates with the CRM system 500 using a connector which has a read client 402 and a write client 403 configured to communicate with the application programming interface (API) of the CRM system 500. The connector 400 further comprises a mapping repository 401 which contains information allowing the corresponding template information and customer related information to be mapped, i.e. associated, to each other.

Further in FIG. 1, an event template repository 200 stores template information of available event templates and is able to transmit template information to the user equipment 100. A report repository 300 stores reports generated by the user equipment 100, and is thus able to receive reports from the user equipment 100, and further, able to transmit reports to the connector 400. Also, a prerequisite repository 250 is provided to store customer related information, preferably customer data, and being able to receive customer related information from the management system 500 via the connector 400, and further, to transmit customer related information to the user equipment 100. In the embodiment of FIG. 1, each of the repositories are stored on a library 150 which can communicate via the network interface 600.

Step 101 represents the instant at which a user initiates the method according to an embodiment of the invention. The user equipment 100 presents 102 the user with event templates available at the event template repository 200. The user chooses a template from the available templates to be used as a current template by entering a user input indicative of an event template to be used as a current template. Advantageously, the user equipment 100 acquires template information of the current template from the event template repository 200, preferably via the network interface 600.

In step 103, the user identifies at least one participant, who is participating in the event and corresponds to at least one customer in the management system 500. The user equipment 100 may, for example, acquire a list of customers from the management system 500 and present this list to the user as a list of possible participants. The user equipment 100 then captures a user input indicative of at least participant and acquires customer related information of the at least one participant from the CRM system 500. Customer related information may be transmitted to the user equipment 100 by the prerequisite repository 250, which in turn acquires the customer related information from the CRM database 501 using the connector 400. Customer related information is fetched by the connector read client 402 communicating with the read service 502, the customer related information being mapped 404 to corresponding prerequisite data fields of the current template using the mapping repository 401 information. The acquired customer related information, particularly customer data, is then preferably stored by the user equipment.

In step 104, the user equipment 100 presents an input query from the at least one series of input queries. In step 105, the user responds to the presented input query using the input capturing device and the user equipment 100 captures the user input in response to the input query. Steps 104 and 105 are then repeated for each input query of the at least one series of input queries.

In step 106, the user equipment 100 executes an action in accordance with input interpretation information, namely generates a structured report based on the template information of the current template, said at least one input value and possible prerequisite data. The structure of the report may be pre-defined either commonly for all templates or separately for each template. Further, the user equipment 100 transmits the generated report to the report repository 300, from which it is sent to the connector 400. At the connector, information contained within the report is mapped 405 to corresponding information at the management system 500 using mapping repository 401 information, and further, sent to the database 501 using the client 403 communicating with the write service 503.

Figure 2C:
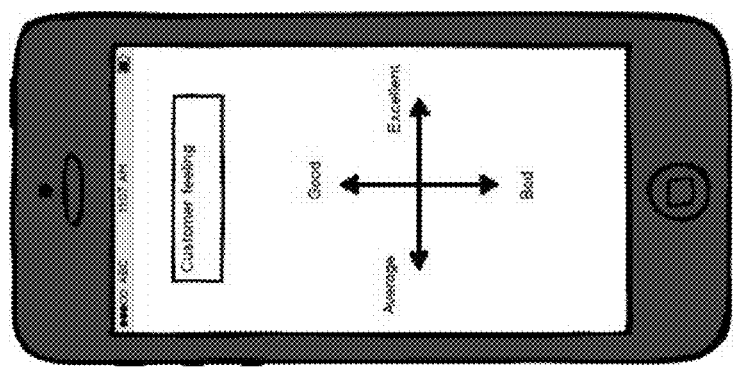
FIG. 2a-2c illustrate different exemplary graphical representations of input values.
Figure 2B:
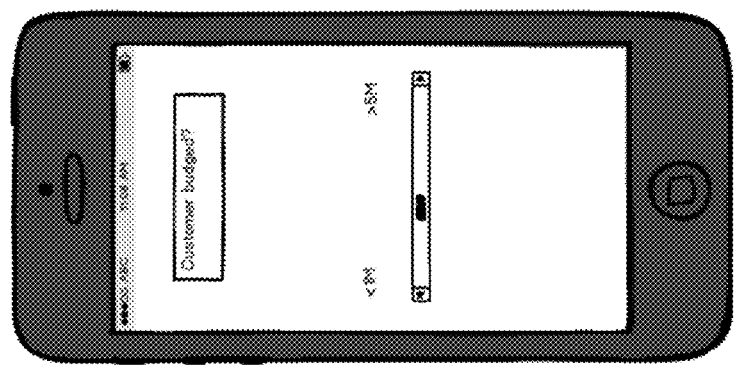
Figure 2A:
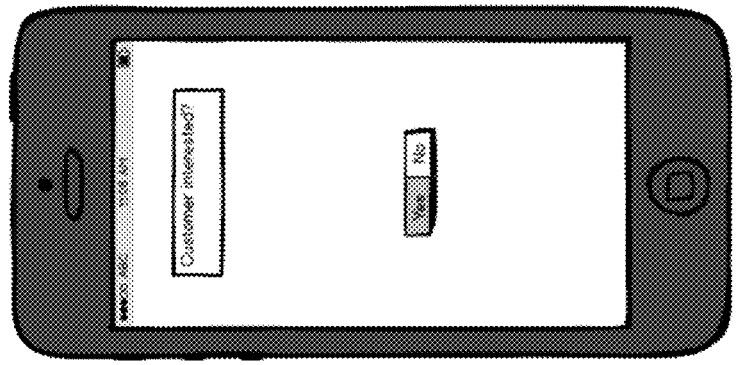

FIG. 2a-2c illustrate exemplary situations in which an input query is presented by the user equipment 100 and the plurality of input values associated to the input query are displayed as graphical representations.

In FIG. 2a, an input query associated to discrete input values is displayed. Two discrete input values (Yes/No) are represented as graphical buttons, intuitively leading the user to enter the desired input value by pressing the corresponding button.

In FIG. 2b, an input query associated with a numerical, i.e. no-discrete input value is displayed. The numerical input value is represented as a graphical scroll bar, intuitively leading the user to move the scroll bar to a position corresponding to a desired input value by sliding his finger on top of the scroll bar.

In FIG. 2c, an input query associated to alternative discrete input values is displayed. Four discrete input values (Average/Good/Excellent/Bad) are represented as two orthogonal axis each having two directions indicated with arrows, thus implying four distinctive directions. Each direction represents an input value, which intuitively leads the user to enter the desired input value by swiping or sliding his finger in the direction of the desired input value.

Hereafter, a method according to an embodiment of the invention is described in operation. Firstly, a network interface 600 is provided. The network interface 600 provides communication between the each of the entities described hereafter. Any kind of network interface may be used, but preferably the entities can communicate with each other via the internet.

A management system 500 is also provided, the management system being arranged to store customer related information of at least one customer. The customer related information comprises at least one event data field. The at least one event data field is envisaged to store a value representing information discussed in the event. Examples of such information are customer interest, customer budget value, customer feeling, customer hopes and intentions, future events and dates thereof, etc.

Advantageously, said customer related information also comprises at least one customer data field. The at least on customer data field is envisaged to store a value representing more general information related to the customer, which is possibly already known prior to the event. Examples of such information are customer account, customer contact, opportunity type, lead type, information concerning previous interactions with customer etc. Preferably, customer related information is stored in a database 501 of the management system 500 and can be transferred or received via a network interface 600 using a read service 502 or a write service 503, respectively.

Naturally, the management system 500 may comprise other functionalities, and the database 501 may comprise other information and data fields. Examples of such management systems are, e.g., customer relationship management (CRM) systems, enterprise resource planning (ERP) systems, and the like. Such management systems are commercially widely available from multiple vendors, such as Microsoft Corporation, Salesforce.com Inc., SAP SE, and Oracle Corporation. The present invention is particularly suitable to be implemented using a management system for managing interactions with current and future customers, i.e. a CRM system.

It should be noted that in the context of this application, the term customer should not be interpreted in the restrictive sense of a party in a commercial transactions. Rather, the term customer should be understood as any party of interest which may be envisaged to participate in an event from which data is generated.

A user equipment 100 is also provided, the user equipment 100 having at least a processor, a memory, a display and an input capturing device. The user equipment is also arranged receive and transmit information via the network interface 600. Preferably, the user equipment 100 is a mobile device such as a mobile phone, a tablet computer or a laptop computer. Suitably, the user equipment is arranged to store computer-readable instructions which, when executed by the processor, cause the user equipment 100 to perform a method according to any embodiment of the present invention.

The input capturing device of the user equipment is preferably capable of capturing gestures, particularly the movement of the arms, hands and fingers of the user. Examples of such input capturing devices are touchpads, touchscreen, different types of motion detectors such as camera-based or infra-red based motion sensors. Although all kinds of gestures may be used as user inputs, particularly pointing, sliding, pinching and rotating motions with the fingers of the user have proven to be useful. Furthermore, as mobile devices with suitable input capturing device are readily available, the input capturing device of the user equipment 100 is preferably a touch screen.

The user equipment 100 may communicate directly with the management system 500 via the network interface 600. However, as many different commercial management systems are available, it is preferable that the user equipment utilizes a connector 400 through which it communicates with the management system 500. This way, the same user equipment 100 may be used for different management systems 500 by providing one or more connectors 400, each customized for a specific management system 500. A connector comprises a mapping repository 401 which contains information enabling data fields of the management database 501 to be associated to corresponding prerequisite data, required by the user equipment. Respectively, the mapping repository 401 also contains information enabling data related to the event to be associated to data fields of the management database 501. Preferably, the mapping repository 401 contains information for associating customer data field of the management system to prerequisite data field of the event templates, and respectively, for associating input values of a report to event data fields of the management system 500.

When a user initiates the method, the user equipment 100 presents 102 the user with available event templates and captures a user input indicative of a current template, which is an event template chosen from the available event templates. Available event templates are stored in an event template repository 200, advantageously on a remote server 150 or a library accessible to the user equipment 100 via a network interface 600. Alternatively, the event template repository may be locally stored by the user equipment 100 and synchronized with a remote event template repository. Preferably, the user equipment 100 stores a local copy of all or at least some of the available event templates for facilitating use when a network interface 600 is temporarily not available.

After the current template has been chosen, i.e. information indicative of the current template has been captured, the user equipment acquires template information of the current template from the event template repository 200 or from a local copy thereof. Said template information comprises at least one input query corresponding to the at least one event data field of the customer related information stored by the management system 500. Like the event data field, the input query is envisaged to represent a topic to be discussed at the event. Each input query has a plurality of associated input values, i.e. possible answer options. Particularly, an input query may be a question, statement, or a claim, whereas the associated input values may be an answers or responses thereto. The template information also comprises input interpretation information that associates a user input to an input value from the plurality of input values. The input interpretation information also associates each user input to at least one action. Examples of such actions are generating a textual representation of the input value, or storing an input value to the management system 500, suitably to the event data field that corresponds to the input query associated to the input values. Other examples of possible actions are, e.g.

generating a report including at least some of the input values, their textual representation, or both. Said actions may also include, for example, sending a generated report to a report repository, the management system 500, or one of the participants, setting up a following event, etc.

The template information preferably further comprises at least one prerequisite data field corresponding to at least one data field of a customer in the management system 500, suitably a customer data field. Said at least one prerequisite data field thus determines which customer related information of the management system 500, particularly customer data fields, are required by the template.

Preferably, the user equipment 100 also captures an input indicative of at least one participant of the event. This could be done before or after choosing the current template. Advantageously, the user is presented with a list of at least some of the customers in the management system 500, the user then choosing the at least one participant from the list. Prerequisite data, i.e. customer related information, such as at least one customer data field of the at least one participant, is then acquired by the user equipment as determined by the at least prerequisite data field of the current template.

Prerequisite data may be acquired either from the management system 500 via the network interface 600 or from a prerequisite repository 250. The prerequisite repository 250 is advantageously stored locally by the user equipment 100, thus facilitating operation when a network interface 600 is temporarily not available. The prerequisite repository may then be synchronized with the management system 500 when the network interface is available again. Advantageously, the prerequisite repository 250 stores at least partially the customer data fields of the customers in the management system 500.

During the event, the user equipment presents 104 the user with an input query and captures 105 a user inputs in response to said input query. The user equipment 100 then determines an input value for the user input in accordance with the input interpretation information and executes 106 the at least one action associated with the user input. This is then repeated for each of the input queries. It should be noted that multiple user inputs may be captured in response to a single input query, and thus, multiple input values may be determined for each input query. Furthermore, multiple actions may be determined by the input interpretation information even for a single user input.

Suitably, at least one input query comprises a graphical representation of said plurality of input values. Preferably, all input values have a graphical representation corresponding to a user input that is associated to the input value by the input interpretation information.

As previously mentioned, the input capturing device is preferably capable of capturing gestures. Subsequently, at least one user input is preferably a gesture captured by the input capturing device. More preferably, all user inputs in response to input queries are gestures. Most preferably, all user inputs are gestures.

Although all kinds of gestures may be used as user inputs, particularly pointing, sliding, pinching and rotating motions with the fingers of the user have proven to be useful.

For example, pointing gestures haven proven suitable user inputs in response to input queries associated to one or more discrete input values, such as illustrated in FIG. 2*a*. Although not the case in FIG. 2*a*, it should be noted that discrete input values need not be exclusive options.

Sliding or swiping gestures have proven suitable user inputs for non-discrete input values, such as numerical values or ranges, as illustrated in FIG. 2*b*. In the case of a range type input value, a gesture may be used to broaden or reduce the scope of the range, or alternatively, each endpoint of the range may be input separately. Sliding or swiping gestures have also proven suitable user inputs for discrete input values, particularly when the discrete input values have been graphically represented as an element indicating a direction, such as an axis or an arrow, such as illustrated in FIG. 2*c*.

Furthermore, rotation and pinching gestures have also proven suitable user inputs for non-discrete input values such as numerical values or ranges. An example of such a rotation gesture is moving two fingers relative to each other such that one finger rotates about another, or the fingers rotate about a common axis. An example of such a pinching gestures is moving two fingers towards or away from each other.

Advantageously, after capturing 105 user inputs in response to presenting input queries 104, a report is generated 106, suitably by the user equipment 100. Preferably, the report comprises at least some of the input values determined in connection of at least some of the input queries. The report may additionally include other information, such as pre-requisite data, the outcomes of the actions associated to the input values, or both.

The report could, for example, be a listing of input values, a textual representation of the input values, or both. Preferably, the report is of a pre-defined structured form, wherein the form and structure may be defined, e.g. commonly for all event templates or separately for each event template. The report is then stored in a report repository 300, advantageously on a remote server 150 or a library accessible to the user equipment 100 via the network interface 600. Alternatively, the report repository 300 may be locally stored by the user equipment 100 and synchronized with a remote repository. Preferably, the user equipment 100 is arranged to store the generated report locally and transmit the report to the report repository 300 when a network interface is available, thus enabling operation while offline.

The report may then be transmitted from the report repository 300 to the management system 500 to be stored as such, or preferably, to be incorporated within the database 501. Alternatively, or in addition to this, the report may also be sent, for example, via e-mail to the at least one participant of the event. It is also possible that multiple reports are generated for different purposes. For example, a report comprising a structured textual representation of the input values may be sent to the at least one participant of the event, and another report comprising a structured listing of the input values may be sent to the management system 500 to be incorporated within the management database 501. Preferably, this is done using the connector 400 which is arranged to associate 405 the contents of the report to respective data fields of the database 501 using the mapping repository 401 information. The connector 400 is then able to transmit the contents of the report to the associated data fields of the management database 501 using the write client 403 that communicates with the write service 503 through the API of the management system 500.

For example, when a report comprising at least one input value, captured in response to at least one input query, is transmitted to the connector 400, the event data field of the management system 500 corresponding to the input query associated to the input value is determined using information of the mapping repository 401. In other words, each input value of a report received by the connector is mapped 405 to the corresponding event data field of the management system 500. Naturally, other information contained within the report, such as prerequisite data and/or customer data, may be mapped to a corresponding data field of the management system 500. The write client 403 then stores at least a part of the information contained within the report in respective data fields of the management database 501 in accordance with the mapping repository 401 information.

A person skilled in the art will appreciate that the method and arrangement according to the present invention may be implemented using an arrangement comprising a processor, a memory, a display, an input capturing device and a network interface, wherein the processor, memory, display, input capturing device and network interface are in communication with each other. In such an arrangement, the memory has instructions for causing the processor to execute the steps of a method according to any embodiment of the invention as described above.

Particularly, a mobile device and one or more servers each storing software code which, when executed, cause the mobile device and one or more servers to act as the user equipment 100 and management system 500, respectively, and to perform the method. Moreover, the management system 500, the connector 400 and each of the repositories 200, 250, 300 may be implemented as software modules, i.e. as instruction executed at the mobile device at the one or more servers.

The invention claimed is:

1. A computer-implemented Method for generating event data, comprising the steps of:
  providing a management system arranged to transmit, receive and store customer related information of at least one customer, said customer related information comprising at least one event data field;
  providing an event template repository arranged to transmit, receive and store template information of at least one event template, said template information comprising:
    at least one input query, corresponding to said at least one event data field of the customer related information of the management system, and having a plurality of associated input values;
    input interpretation information for each input query, said input interpretation information associating a user input to an input value from the plurality input values, and associating said user input to at least one action;
  providing a user equipment having at least a display and an input capturing device;
  presenting said at least one input query with the display means for the user equipment,
  capturing a user input in response to said at least one input query with the input capturing device,
  determining an input value for each user input in accordance with the input interpretation information; and
  execute at least one action for each input in accordance with the input interpretation information, wherein
    said customer related information of the management system further comprises at least one customer data field,
    said template information further comprises at least one prerequisite data field, and the method further comprising the steps of:
      capturing, with the input capturing device, a user input indicative of an event template to be used as a current template, and acquiring template information of the current template from the event template repository;
      capturing, with the input capturing device, a user input indicative of at least one participant of the event corresponding to the at least one customer in the management system, and acquiring said at least one customer data field of the at least one participant from the management system based on the at least one prerequisite data field of the current template,
    wherein said at least one input query and said input interpretation information are those of the current template, and
    wherein said at least one action comprises:
      storing at least one input value to the event data field of the management system corresponding to the input query associated to each of the input values; and/or
      generating a report including a textual representation of at least one input value, the acquired at least one customer data field, or both, and storing said report in a report repository.

2. The method of claim 1, further comprising the steps of providing a connector comprising a mapping repository having information for associating input values to corresponding event data fields of the management system
  wherein, said at least one action comprises storing at least one input value to the event data field of the management system as associated by the mapping repository.

3. The method of claim 1, wherein said at least one input query comprises a graphical representation of said plurality of input values, and wherein said user input is a gesture corresponding to said graphical representation.

4. The method of claim 1, wherein a touch-screen is used as the display and the touch-based input capturing device and wherein said user input is a touch gesture.

5. The method of claim 1, wherein said management system is a CRM or ERP system.

6. An arrangement for generating event data, comprising:
  a network interface;
  a management system having at least one or more processors arranged to store customer related information of at least one customer, and to transmit and receive said customer related information via the network interface, said customer related information comprising at least one event data field;
  an event template repository arranged to store template information of at least one event template, and to transmit and receive said template information via the network interface, said template information comprising:
    at least one input query, corresponding to said at least one event data field of the customer related information of the management system, and having a plurality of associated input values;
    input interpretation information for each input query, said input interpretation information associating a user input to an input value from the plurality input values, and associating said user input to at least one action;
  a user equipment having at least a memory, a processor, a display and an input capturing device, said user equipment being arranged to transmit and receive data via the network interface, wherein the user equipment is configured to:
    present said at least one input query with the display of the user equipment capture a user input in response to said at least one input query with the input capturing device, determine an input value for each user input in accordance with the input interpretation information; and execute at least one action for each user input in accordance with the input interpretation information, wherein said customer related information of the management system further comprises at least one customer data field, said template information further comprises at least one prerequisite data field, and the user equipment being further arranged to:

capture, with the input capturing device, a user input indicative of an event template to be used as a current template, and acquire template information of the current template from the event template repository;

capture, with the input capturing device, a user input indicative of at least one participant of the event corresponding to the at least one customer in the management system, and acquire said at least one customer data field of the at least one participant from the management system based on the at least one prerequisite data field of the current template, wherein said at least one input query and said input interpretation information are those of the current template, and wherein said at least one action comprises:

store at least one input value to the event data field of the management system corresponding to the input query associated to each of the input values; and/or generate a report including a textual representation of at least one input value, the acquired at least one customer data field, or both, and store said report in a report repository.

7. The arrangement of claim 6 further comprising:

a connector comprising a mapping repository having information for associating input values to corresponding event data fields of the management system wherein, said connector is further arranged to store at least one input value to the event data field of the management system as associated mapping repository.

8. The arrangement of claim 6, wherein the display is arranged to represent a graphical representation of said plurality of input values of said at least one input query, and wherein said input capturing device is arranged to capture a gesture corresponding to said graphical representation.

9. The arrangement of claim 6, wherein a touch-screen is used as the display and the touch-based input capturing device and wherein said user input is a touch gesture.

10. The arrangement of claim 6, wherein said management system is a CRM or ERP system.

11. An arrangement comprising a processor, a memory, a display, an input capturing device and a network interface, said processor, memory, display, input capturing device and network interface being in communication with each other, wherein the memory has instructions for causing the processor to execute the steps of:

providing a management system arranged to transmit, receive and store customer related information of at least one customer, said customer related information comprising at least one event data field;

providing an event template repository arranged to transmit, receive and store template information of at least one event template, said template information comprising:

at least one input query, corresponding to said at least one event data field of the customer related information of the management system, and having a plurality of associated input values;

input interpretation information for each input query, said input interpretation information associating a user input to an input value from the plurality input values, and associating said user input to at least one action;

providing a user equipment having at least a display and an input capturing device;

presenting said at least one input query with the display means of the user equipment;

capturing a user input in response to said at least one input query with the input capturing device, determining an input value for each user input in accordance with the input interpretation information; and executing at least one action for each input in accordance with the input interpretation information, wherein said customer related information of the management system further comprises at least one customer data field, said template information further comprises at least one prerequisite data field, and the method further comprising the steps of:

capturing, with the input capturing device, a user input indicative of an event template to be used as a current template, and acquiring template information of the current template from the event template repository;

capturing, with the input capturing device, a user input indicative of at least one participant of the event corresponding to the at least one customer in the management system, and acquiring said at least one customer data field of the at least one participant from the management system based on the at least one prerequisite data field of the current template, wherein said at least one input query and said input interpretation information are those of the current template, and wherein said at least one action comprises:

storing at least one input value to the event data field of the management system corresponding to the input query associated to each of the input values; and/or generating a report including a textual representation of at least one input value, the acquired at least one customer data field, or both, and storing said report in a report repository.

* * * * *